(12) United States Patent
Cosimini et al.

(10) Patent No.: US 8,805,295 B2
(45) Date of Patent: Aug. 12, 2014

(54) SYSTEM AND METHOD UTILIZING TRANSMIT DIVERSITY

(75) Inventors: Peter Cosimini, Newbury (GB); Andrew Dunkin, Newbury (GB); Paul Edwards, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 359 days.

(21) Appl. No.: 12/804,570

(22) Filed: Jul. 23, 2010

(65) Prior Publication Data

US 2011/0021225 A1   Jan. 27, 2011

(30) Foreign Application Priority Data

Jul. 24, 2009 (GB) .................................. 0912859.6

(51) Int. Cl.
H04B 7/04 (2006.01)
(52) U.S. Cl.
USPC ................ 455/69; 455/562.1; 455/276.1
(58) Field of Classification Search
USPC ........... 455/101, 114.2, 121, 126, 67.11, 561, 455/562.1, 69, 67.16, 575.7
See application file for complete search history.

(56) References Cited

U.S. PATENT DOCUMENTS

| | | | | |
|---|---|---|---|---|
| 5,613,219 | A * | 3/1997 | Vogel et al. .................... | 455/78 |
| 6,917,597 | B1 | 7/2005 | Schmidl et al. | |
| 7,627,051 | B2 * | 12/2009 | Shen et al. .................... | 375/267 |
| 7,630,339 | B2 * | 12/2009 | Laroia et al. ................... | 370/330 |
| 7,643,799 | B2 * | 1/2010 | Hamalainen et al. ........... | 455/69 |
| 8,515,435 | B2 * | 8/2013 | Krasny et al. ................ | 455/450 |
| 2006/0098760 | A1 | 5/2006 | Shen et al. | |
| 2010/0144282 | A1* | 6/2010 | Laroia et al. ................ | 455/63.3 |

FOREIGN PATENT DOCUMENTS

| | | |
|---|---|---|
| EP | 1919115 A2 | 5/2008 |
| EP | 2151937 A1 | 2/2010 |
| WO | WO2008149533 | 12/2008 |

OTHER PUBLICATIONS

Niranjayan, S; Nallanathan, A.; Kaman, B., "An adaptive transmit diversity scheme based on spatial signal combining for TH-PPM UWB", Spread Spectrum Techniques and Applciations, 2004 IEEE Eighth International Symposium on, vol., No., pp. 150-154, Aug.30-Sep. 2, 2004.
Khan, F; Van Rensburg, C, "An Adaptive Cyclic Delay Diversity Technique for Beyond 3G/4G Wireless Systems", Vehicular Technology Conference, 2006, VTC-2006 Fall. 2006 IEEE $64^{th}$, vol., No., pp. 1-6, Sep. 25-28, 2006.
Samsung: "Further Details on Adaptive Cyclic Delay Diversity Scheme", 3GPP Draft; R1-051046, $3^{rd}$ Generation Partnership Project (3GPP), Mobile Competence Centre; 3GPP TSG RAN WG1 Meeting #42bis, San Diego, USA; Oct. 10-14, 2005, R1-051046, XP050100667.

* cited by examiner

*Primary Examiner* — Blane J Jackson
(74) *Attorney, Agent, or Firm* — Muirhead and Saturnelli, LLC

(57) ABSTRACT

In a telecommunications network including a mobile terminal and a base station associated with a plurality of antennas, with each antenna configured to transmit the signal with a time offset relative to the other antenna or antennas, an engine for controlling a signal to be transmitted wirelessly from the base station towards the mobile terminal, the engine being configured to receive one or more parameter measurements relevant to the mobile terminal; and use the one or more parameter measurements to adjust the time offset of at least one of the antennas in order to adapt the signal transmission dependent upon the mobile terminal's instantaneous circumstances. Ideally the engine is configured to receive the one or more parameter measurements relating to a plurality of different mobile terminals, and independently adjust the time offset for each of the plurality of different mobile terminals, depending upon the one or more applicable parameter measurements.

13 Claims, 2 Drawing Sheets

SYSTEM AND METHOD UTILIZING TRANSMIT DIVERSITY

TECHNICAL FIELD

This application relates to a system and method for minimizing fading of transmitted signals in a mobile telecommunications network. More particularly, this application relates to a method utilizing a transmit diversity technique and is particularly relevant to 3G Wideband CDMA though can be applied to any mobile communications systems designed to benefit from transmit diversity.

BACKGROUND

In mobile telecommunications networks, fading is a well known problem which affects transmitted signals. A signal received in a mobile radio system experiences fading due to multiple reflective paths between the transmitter and receiver. This multi-path fading can result in errors in the received data.

Fading results from the presence of reflectors in the environment surrounding a transmitter and receiver, which creates multiple paths that a transmitted signal can traverse. As a result, the receiver sees the superposition of multiple copies of the transmitted signal, each traversing a different path. Each signal copy will experience differences in attenuation, delay and phase shift while travelling from the source to the receiver. This can produce either constructive or destructive interference, amplifying or attenuating the signal power seen at the receiver.

In this regard, two types of fading can be defined, namely frequency selective fading and flat fading (i.e. frequency non-selective). These forms of fading depend on the duration of a transmitted data symbol relative to the delay spread of the paths.

Flat fading occurs when the duration of the transmitted data symbol is large compared to the relative delay of the paths. Therefore, all frequency components of the signal will experience the same magnitude of fading. Flat fading can be addressed using techniques such as error coding, simple equalization or adaptive bit loading.

Alternatively, if the duration of the transmitted data symbol is small compared to the relative path delay the fading is classed as frequency selective. In frequency-selective fading, the coherence bandwidth, which measures the separation in frequency after which two signals will experience uncorrelated fading, of the channel is smaller than the bandwidth of the signal. Different frequency components of the signal therefore experience de-correlated fading. By comparison, in flat fading, the coherence bandwidth of the channel is larger than the bandwidth of the signal.

Fading can cause poor performance in a communication system because it can result in a loss of signal power without reducing the power of the noise. This signal loss can be over some or all of the signal bandwidth.

The effects of fading can be combated by using a "diversity" scheme to transmit the signal over multiple channels that experience independent fading, and thereafter coherently combining them at the receiver. The probability of experiencing a fade in this composite channel is then proportional to the probability that all the component channels simultaneously experience a fade, a much more unlikely event. Diversity schemes vary the transmitted signal by a given transmission characteristic, and can be achieved in time, frequency and/or space.

OFDM (Orthogonal Frequency Division Modulation) is an example of a spread spectrum technique which employs frequency diversity to provide enhanced robustness to fading. OFDM divides the wideband signal into many slowly modulated narrowband sub-carriers, each exposed to flat fading rather than frequency selective fading. The flat fading can then be combated using error coding, simple equalization or adaptive bit loading.

Another approach is to use a rake receiver. Rake receivers are radio receivers designed to counter the effects of multi-path fading. They do this by using several "sub-receivers" each assigned to a different multi-path component. Each sub-receiver independently decodes a single multi-path component, which are delayed copies of the original transmitted wave travelling through a different echo path, each with a different magnitude and time-of-arrival at the receiver. Since each component contains the original information, if the magnitude and time-of-arrival (phase) of each component is computed at the receiver (through a process called channel estimation), then all the components can be added coherently to improve the reliability of the transmitted information. Rake receivers are common in a wide variety of CDMA and W-CDMA radio devices such as mobile phones and wireless LAN equipment.

However, with such spread spectrum techniques, if the delay spread is small, the signal is no longer frequency selective and the link may no longer be optimal. In such situations time diversity can be employed, typically termed Time Delay Transmit Diversity (TDTD). In TDTD multiple transmit antennas are used to artificially create time dispersion by transmitting replica signals with different relative delays from the different antennas. By exploiting the independent levels of fading, it is possible to recover a significant amount of any lost bit error-rate (BER) performance and improve overall system performance by using TDTD.

FIG. 2 illustrates this technique for a two antenna system. In this Figure, a base station (BS) transmits a signal s(t) towards a mobile terminal (MS). This signal is transmitted via two antennas. The first antenna transmits with signal s(t) with no time delay, whilst the second antenna transmits the signal with a time delay $\Delta T$, so that the signal transmitted from the second antenna is $s(t-\Delta T)$.

The relative delay T is fixed, and chosen to create a frequency selective channel over the transmitted signal bandwidth. For instance, a typical fixed value would be chosen at deployment and based on some average delay spread appropriate for at least the whole cell area for the BS, as well as the antenna configuration (e.g. taking into account tilt, azimuth etc).

The integration of the fixed time delay is transparent to the MS and the BS, as the receiver of the MS considers the delay as being due to normal multi-path reflections in the propagation channel and accordingly will utilize the inherent properties to optimize signal reception. TDTD therefore does not therefore require any standards support. Further, it can be offered as a third party add-on hardware solution, placed between the output transmission port of the BS and the additional antenna(s).

Whilst this approach of introducing a fixed time delay into one or more additional signal paths can work well, there is room for further improvement.

For instance, the TDTD technique described above assumes a mobile station experiences the same conditions at all locations within the serving base station's cell. Whilst this can be a reasonable approximation in some circumstances, it is of course not necessarily the case, and can lead to some instances of fading not being adequately corrected or accounted for.

SUMMARY OF THE INVENTION

According to the system described herein, in a telecommunications network including a mobile terminal and a base station associated with an antenna arrangement comprising a plurality of antennas, with each antenna configured to transmit the signal with an offset relative to the other antenna or antennas, an engine for controlling a signal transmitted wirelessly from the base station towards the mobile terminal is configured to: receive one or more parameter measurements relating to the mobile terminal; and use the one or more parameter measurements to adjust the offset of at least one of the plurality of antennas in order to adapt the signal transmission to the mobile terminal's instantaneous circumstances.

The engine may be a component of the base station or the antenna arrangement.

The offset may be a time offset and an adaptive time delay may be introduced. By introducing an adaptive time delay, it becomes possible for the engine to react to feedback, particularly from the mobile terminal. Since the level of dispersion is dependent on many factors, in addition to location, this aspect of the system described herein is therefore able to provide greater flexibility than a fixed time delay can achieve.

A further advantage is that by utilizing a mobile terminal specific parameter to adapt the time delay, such as a mobile-measured and reported signal level parameter (e.g. RSSI, RSCP) or a mobile-measured and reported signal quality parameter (e.g. CQI) or base station-estimated mobile speed it becomes possible to arrive at the most appropriate time delay for the conditions, in order to implement an efficient Time Delay Transmit Diversity scheme.

In a particularly advantageous aspect, the controller may be configured to receive the one or more reported parameter measurements relating to a plurality of different mobile terminals; and independently adjust the time offset for each of the plurality of different mobile terminals, depending upon the one or more applicable parameter measurements.

In this way, relative delays may be adapted for each individual mobile terminal receiving the data, based on its instantaneous channel conditions (e.g. dependent on its location or speed). As this channel naturally varies, by adapting the delays/offset over time, link quality can be optimized as well as the resulting user and overall system data throughput.

Further, by utilizing parameter measurements already forwarded by mobile terminals to the network, the system described herein may be implemented with no, or at least minimal, increase in signalling.

According further to the system described herein, in a telecommunications network including a mobile terminal and a base station associated with a plurality of antennas, with each antenna configured to transmit a signal with an offset relative to the other antenna or antennas, a method of dynamically adjusting the offset is provided. The method includes receiving at least one parameter measurement relevant to the mobile terminal, and using the at least one parameter measurement to adjust the offset of at least one of the antennas in order to adapt the signal transmission dependent upon the mobile terminal's instantaneous circumstances.

According further to the system described herein, in a telecommunications network including a mobile terminal and a base station associated with a plurality of antennas, with each antenna configured to transmit the signal with an offset relative to the other antenna or antennas, an engine for controlling a signal to be transmitted wirelessly from the base station towards the mobile terminal is provided. The engine comprises a non-transitory computer readable medium storing computer software, the computer software comprising: executable code that receives at least one parameter measurement relevant to the mobile terminal; and executable code that uses the at least one parameter measurement to adjust the offset of at least one of the antennas in order to adapt the signal transmission dependent upon the mobile terminal's instantaneous circumstances.

BRIEF DESCRIPTION OF THE DRAWINGS

Embodiments of the system described herein will be described in detail with reference to the accompanying drawings, which are briefly described as follows.

DETAILED DESCRIPTION OF VARIOUS EMBODIMENTS

Figure 1:
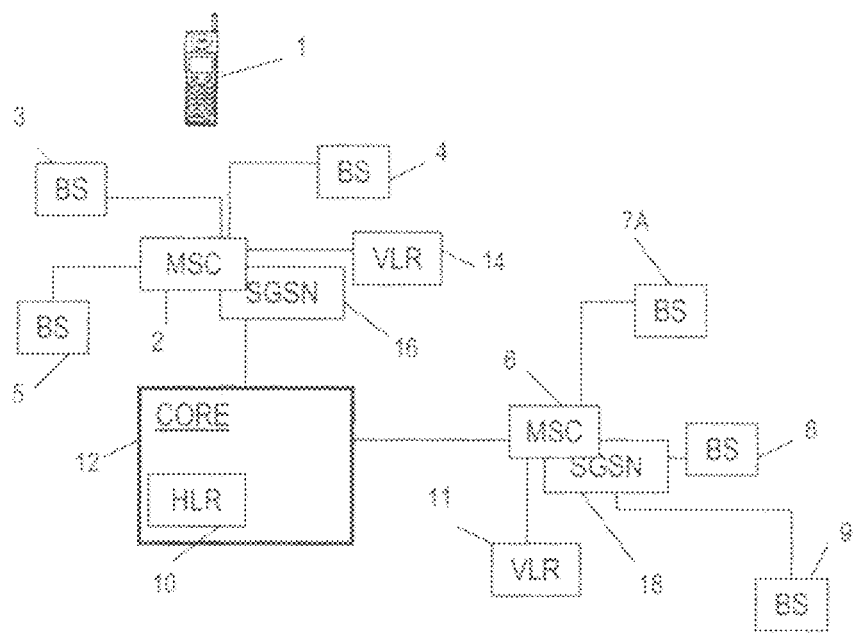
FIG. 1 illustrates an example mobile communication network in which embodiments of the system described herein may be implemented.
Figure 2:
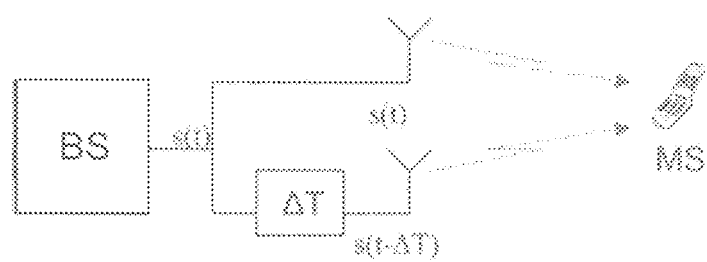
FIG. 2 illustrates the Time Delay Transmit Diversity technique in accordance with the prior art.

FIG. 1 illustrates an example telecommunications network configuration in which embodiments of the system described herein may be implemented.

The mobile device (MS) is shown in FIG. 1 at 1. The mobile device may be any suitable portable device, including a handheld mobile telephone, a personal digital assistant (PDA), dedicated traffic navigation device or a laptop computer equipped with a network connectivity datacard.

The telecommunications network illustrated includes a number of base stations, where each base station (BS) serves a respective cell of the cellular/mobile telecommunication network. The mobile terminal will register with a BS, typically the one providing it with the strongest signal (usually, but not necessarily, the closest BS) in order to be able to send and receive communications across the telecommunications network.

In a 3G mobile telecommunications network, such as UMTS, each base station comprises a node B and a radio network controller (RNC). An RNC may control more than one node B. The node B's and RNC's comprise the radio access network.

Although the system described herein has particularly applicability to 3G networks, it may also be adapted for use in 2G networks, such as GSM, and the proposed 4G LTE mobile telecommunications network. In LTE, each base station comprises an eNode B which combines the RNC and Node B functionalities. The base stations are arranged in groups and each group of base stations is likely to be controlled by a Mobility Management Entity (MIME) and a User Plane Entity (UPE).

Other appropriate mobile network configurations may also be used in connection with the system described herein.

Conventionally, in a UMTS network, the base stations are arranged in groups and each group of base stations is controlled by one serving GPRS support node (SGSN), such as SGSN 16 for base stations 3, 4 and 5. As shown in FIG. 1, the network has another SGSN 18, which is controlling a further three base stations 7, 8 and 9. In practice, the network will incorporate many more SGSNs and base stations than shown in FIG. 1.

The SGSNs 16 and 18 are provided to support communications in the packet switched domain—such as GPRS data transmissions. The SGSNs 16 and 18 are in turn connected to a gateway GPRS support node (GGSN—not shown), which provides a gateway to data networks, such as the Internet.

Each mobile terminal, to be communicable with the telecommunications network, is typically provided with a smart card or SIM which identifies the subscriber to the network. In this regard, the SIM card is pre-programmed with a unique identification number, the "International Mobile Subscriber Identity" (IMSI), for use by the network. When a terminal is registered with a BS, a home location register (HLR) 10 in the network stores this IMSI, along with the BS identity, so that the traffic status information can be correctly directed towards the mobile terminal.

Figure 3:
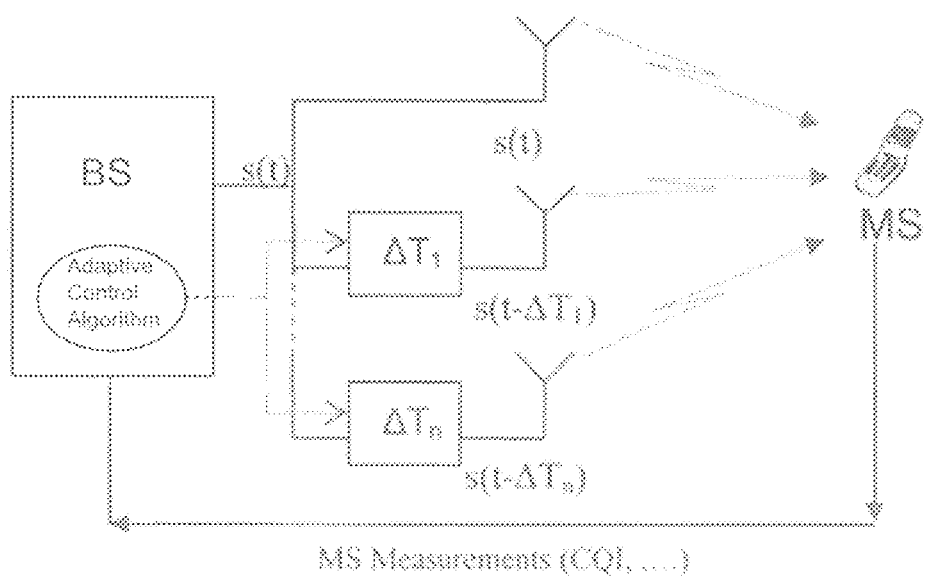
FIG. 3 illustrates a Time Delay Transmit Diversity technique in accordance with an embodiment of the system described herein.

With this background in mind, an embodiment of the system described herein will now be described with reference to FIG. 3. FIG. 3 illustrates a base station (BS) transmitting a signal s(t) towards a mobile terminal (MS) using Transmit Diversity. As indicated earlier, digital wireless systems, which employ spread spectrum techniques, such as Code Division Multiple Access (CDMA), may implement diversity transmission techniques to alleviate the effects of fading on a communications link between mobile terminals and base stations The signal s(t) is transmitted via a plurality of antennas n. That is, at least two transmitting antennas are utilized. A first antenna transmits the signal s(t) with no time delay, whilst a second antenna transmits the signal with a time delay $\Delta T$, so that the signal transmitted from the second antenna, relative to the first antenna, is $s(t-\Delta T)$. Where more than two antennas are provided, the signal transmitted from the second antenna is $s(t-\Delta T_1)$ and each subsequent antenna transmits the signal with a time delay $s(t-\Delta T_n)$.

This embodiment of the system described herein is particularly applicable to four way receive diversity, where four transmission paths and antennas are utilized. However, it is also applicable to the more common two way receive diversity, and more generally with Multiple Input Multiple Output (MIMO) techniques.

Where two way receive diversity is implemented, the second antenna will transmit the same signal as the first antenna, although with a relative offset of $\Delta T$. The mobile terminal will receive these two combined signals which will have the same information content but different combined channel conditions compared to the case if only one signal was transmitted from one antenna.

Where four way receive diversity is implemented, the second to fourth antennas will transmit the same signal as the first antenna, although each with a different respective offset (i.e. $\Delta T_1$, $\Delta T_2$, $\Delta T_3$). The mobile terminal will receive these four signals with the same information content but different interference conditions.

Due to the greater number of signals transmitted, four-way diversity has a higher gain than two way diversity. Therefore, advantageously, four-way diversity can reduce the mobile station transmission power for the same quality of service, thus increasing its battery power savings.

According to this embodiment of the system described herein, the offset/time delay $\Delta T$ is not fixed, but is instead an adaptive time delay. Ideally, this time delay is adaptable according to one or more signal parameters associated with the recipient mobile terminal, such as an instantaneous signal quality parameter measurement and/or a signal level parameter measurement. These parameters may be measured by the mobile terminal itself and communicated to a controller of the adaptive time delay, or measured by a component of the base station, such as a base station receiver on the uplink. The controller is also typically a component of the base station.

In the FIG. 3 embodiment of the system described herein, the time delays of each of the antennas are adapted by the controller, using an adaptive control algorithm. The adaptive control algorithm is configured to adjust the time delay $\Delta T$ depending upon the instantaneous parameter measurement, with the aim of improving the quality of the signals received by the mobile terminal.

For instance, where the measured parameter(s) suggest that the signal received by the mobile terminal is too dispersive, indicating the coherence bandwidth is too large relative to the signal bandwidth, the relative time offset $\Delta T_i$ is increased in order to reduce the coherence bandwidth.

According to one preferred implementation, the signal parameter utilized in the adaptive control algorithm is the Channel Quality Indicator (CQI). Advantageously the CQI is a parameter which mobile terminals regularly transmit to base stations in 3G and LTE. A CQI for a channel is typically computed by making use of performance metric, such as a signal-to-noise ratio (SNR), signal-to-interference plus noise ratio (SINR), signal-to-noise plus distortion ratio (SNDR), and so forth of the channel.

Traditionally, CQI values are used by base stations to select a modulation and coding scheme (MCS) for the mobile terminal(s) to which they apply. Where CQI is used as a parameter measurement in adapting the time delay for the TDTD, the relative time delay will be adjusted (i.e. typically increased) until a suitable CQI has been obtained. Once a suitable CQI is obtained, the time delay will be maintained without change, or at least very little variation.

The simplest implementation of the adaptive control algorithm is to adjust the time delays equally for all but one of the antennas in the antenna assembly (i.e. one antenna is allowed to transmit without a delay). For instance the first antenna would transmit s(t) at time t=0, the second antenna at time t=2 µs, the third antenna at time t=4 µs and the fourth antenna at time t=6 µs. In this regard, the relative time delay between all of the antennas is 2 µs. If the adaptive controller determines that the CQI needs to be improved, the time delay may be increased, so that the second antenna transmits s(t) at time t=3 µs, the third antenna at time t=6 µs and the fourth antenna at time t=9 µs. The relative time delay has therefore been increased from 2 µs to 3 µs.

Therefore, by adjusting the relative delays on the different antennas, such that they are adapted over time based on the regular CQI reports, the relative delays can be set per individual MS receiving the data based on its local instantaneous channel conditions and adapting over time as this channel naturally varies.

A practical illustration of how the relative offset may utilized on per mobile terminal basis will now be provided. For example, consider the typical scenario where a base station is serving two mobile stations A and B. The mobile stations are in different locations; mobile station A has no direct line-of-sight path to the base station and is surrounded by a large number of local "scatterers" (e.g. buildings) whereas mobile station B has a dominant line-of-sight path to the base station and located in an open area with no local scatterers in its vicinity. Both mobile stations have similar path-loss to the serving base station and therefore receive the same average power levels, however, mobile station A's receiver can utilize the inherent diversity (frequency selectivity) provided by the channel dispersion (small channel coherence bandwidth) and experience a high data throughput while mobile B's channel has little or no dispersion (large coherence bandwidth) and therefore experiences deep 'flat' channel fades with a corresponding low data throughput. In this case the adaptive control algorithm can detect that the reported signal level measurements (or signal-to-noise ratio measurements) from the mobile stations are similar but mobile station B's throughput is much lower. The control algorithm can therefore utilize this information to inject time dispersion/diversity into the channel by increasing the delay on the additional transmission paths when transmitting to mobile station B, in an optimal fashion to increase the corresponding data throughput. Advantageously, this process requires no explicit signalling and is transparent to the UE.

This example therefore illustrates that by using parameter measurements that relate to a mobile terminal's instantaneous environmental conditions, such as would be communicated in the MS's CQI reports, the relative antenna time delay may be adjusted based upon these measurements, thereby providing a mobile terminal dependent relative time delay adjustment.

In other words, the controller can adjust and adapt the time delay applicable to each of a plurality of mobile terminals operating through a given base station and the associated multiple antenna assembly. In this way, different mobile terminals within a particular cell may have TDTD applied to their communications, with the time delay adjusted depending upon their own unique and instantaneous situation.

It is to be appreciated that any apparatus required to effect the system described herein may be implemented within the base station itself, associated with each of the antennas (i.e. outside of the base station) or incorporated within each of the antennas. Where effected within the base station, the implementation will typically be a digital implementation, and be an analog implementation where located on an antenna.

It is to be appreciated that the embodiments of the system described herein that have been described are to be taken as illustrative of the system described herein and not limiting. In this regard changes and additions are possible to the described embodiment without departing from the essence of the invention.

For example, although the embodiments have been described with particular reference to CQI, other parameter measurements are possible. In particular, other measurements specified in 3GPP standards would be particularly useful, such as those either measured and reported by the MS (e.g. RSSI and RSCP). However, measurements not specified in the 3GPP Standard may also be used, such as those derivable by the eNodeB (e.g. UE speed estimate, UE data throughput estimate) or measured by the base station receiver on the opposite data link (i.e. the uplink). The latter may be beneficial for Time Division Duplexing (TDD) systems were uplink and downlink data are transmitted using the same frequency, resulting in both channels being strongly correlated.

Additionally, whilst the above described embodiments focussed on just one parameter measurement being taken into account in making adjustments to the relative time delay, more than one different parameter measurement may be utilized, such as CQI, RSSI, RSCP, UE speed and UE data throughput.

Further, with regard to four way diversity, the embodiment was described in regard to adjusting each of the relative time offsets by the same amount. Alternatively, only a portion of the time delays may be adjusted and/or each time delay may be adjusted to a different extent. That is, each time delay $\Delta T_n$ may be the same, so that a set of antennas transmit the signal s(t) sequentially and evenly relative to the previous antenna. Alternatively, the time delays $\Delta T_n$ may be wholly independent.

Further, the embodiments of the system described herein have been described in relation to time diversity techniques. It is also within the scope of the system described herein to adapt different diversity techniques such as space diversity and polarisation diversity.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. In a telecommunications network including a mobile terminal and a base station associated with a plurality of antennas configured to transmit a signal, an engine for controlling wireless transmission of the signal from the base station towards the mobile terminal, the engine being configured to:
receive a plurality of parameter measurements relevant to the mobile terminal;
determine a time offset which is adaptable depending on the plurality of parameter measurements; and
apply the determined time offset to at least one of the plurality of antennas in order to adjust timing of the signal transmission from the least one of the plurality of antennas by the determined time offset in a manner dependent upon the mobile terminal's instantaneous circumstances, wherein the mobile terminal's instantaneous circumstances are indicated by varying of the plurality of parameter measurements over time according to speed or location of the mobile terminal, the plurality of parameter measurements including at least one of: (i) a signal level measured and reported by the mobile terminal or (ii) a signal quality measured and reported by the mobile terminal, wherein the plurality of antennas include at least first and second antennas, and wherein the second antenna is configured to transmit the same signal as the first antenna but with the determined time offset.

2. The engine of claim 1, wherein the engine is configured to receive the plurality of parameter measurements relating to a plurality of different mobile terminals, and independently determine the time offset for each of the plurality of different mobile terminals, as required, depending upon the plurality of parameter measurements.

3. The engine of claim 1, wherein the plurality of parameter measurements that the engine is configured to use to determine the time offset includes at least one of:

a) a channel quality indicator (CQI);
b) a received signal strength indicator (RSSI);
c) a received signal code power (RSCP); or
d) an estimated mobile terminal data throughput.

4. The engine of claim 1, wherein the engine is a component of the base station.

5. The engine of claim 1, wherein the engine is a component of the antenna assembly.

6. In a telecommunications network including a mobile terminal and a base station associated with a plurality of antennas configured to transmit a signal, a method of controlling wireless transmission of the signal from the base station towards the mobile terminal, comprising:
    receiving a plurality of parameter measurements relevant to the mobile terminal;
    determining a time offset which is adaptable depending on the plurality of parameter measurements; and
    applying the determined time offset to at least one of the plurality of antennas in order to adjust timing of the signal transmission from the least one of the plurality of antennas by the determined time offset in a manner dependent upon the mobile terminal's instantaneous circumstances, wherein the mobile terminal's instantaneous circumstances are indicated by varying of the plurality of parameter measurements over time according to speed or location of the mobile terminal, the plurality of parameter measurements including at least one of: (i) a signal level measured and reported by the mobile terminal or (ii) a signal quality measured and reported by the mobile terminal, wherein the plurality of antennas include at least first and second antennas, and wherein the second antenna is configured to transmit the same signal as the first antenna but with the determined time offset.

7. The method of claim 6, further comprising:
    receiving the plurality of parameter measurements relating to a plurality of different mobile terminals; and
    independently adapting the determined time offset for each of the plurality of different mobile terminals, as required, depending upon the plurality of parameter measurements.

8. The method of claim 6, wherein the plurality of parameter measurements received includes at least one of:
a) a channel quality indicator (CQI);
b) a received signal strength indicator (RSSI);
c) a received signal code power (RSCP); or
d) an estimated mobile terminal data throughput.

9. In a telecommunications network including a mobile terminal and a base station associated with a plurality of antennas configured to transmit a signal, an engine for controlling wireless transmission of the signal from the base station towards the mobile terminal, the engine comprising a non-transitory computer readable medium storing computer software, the computer software comprising:
    executable code that receives a plurality of parameter measurements relevant to the mobile terminal;
    executable code that determines a time offset which is adaptable depending on the plurality of parameter measurements; and
    executable code that applies the determined time offset to at least one of the plurality of antennas in order to adjust the timing of signal transmission from the least one of the plurality of antennas by the determined time offset in a manner dependent upon the mobile terminal's instantaneous circumstances, wherein the mobile terminal's instantaneous circumstances are indicated by varying of the plurality of parameter measurements over time according to speed or location of the mobile terminal, the plurality of parameter measurements including at least one of: (i) a signal level measured and reported by the mobile terminal or (ii) a signal quality measured and reported by the mobile terminal, wherein the plurality of antennas include at least first and second antennas, and wherein the second antenna is configured to transmit the same signal as the first antenna but with the determined time offset.

10. The engine of claim 9, wherein the executable code that receives the plurality of parameter measurements includes executable code that receives the plurality of parameter measurements relating to a plurality of different mobile terminals, and wherein the executable code that uses the plurality of parameter measurements includes executable code that independently adapts the determined time offset for each of the plurality of different mobile terminals, as required, depending upon the plurality of parameter measurements.

11. The engine of claim 9, wherein the plurality of parameter measurements includes at least one of:
a) a channel quality indicator (CQI);
b) a received signal strength indicator (RSSI);
c) a received signal code power (RSCP); or
d) an estimated mobile terminal data throughput.

12. The engine of claim 9, wherein the engine is a component of the base station.

13. The engine of claim 9, wherein the engine is a component of the antenna assembly.

\* \* \* \* \*